(12) United States Patent
Wendt et al.

(10) Patent No.: US 10,352,508 B2
(45) Date of Patent: Jul. 16, 2019

(54) DC-POWERED LIGHTING DEVICE

(71) Applicant: SIGNIFY HOLDING B.V., Eindhoven (NL)

(72) Inventors: Matthias Wendt, Würselen (DE); Harald Josef Günther Radermacher, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/095,103

(22) PCT Filed: Apr. 4, 2017

(86) PCT No.: PCT/EP2017/057941
§ 371 (c)(1),
(2) Date: Oct. 19, 2018

(87) PCT Pub. No.: WO2017/182260
PCT Pub. Date: Oct. 26, 2017

(65) Prior Publication Data
US 2019/0120441 A1 Apr. 25, 2019

(30) Foreign Application Priority Data
Apr. 22, 2016 (EP) .................... 16166628

(51) Int. Cl.
H05B 37/02 (2006.01)
F21K 9/20 (2016.01)
(Continued)

(52) U.S. Cl.
CPC .............. *F21K 9/278* (2016.08); *F21V 23/04* (2013.01); *F21V 23/06* (2013.01);
(Continued)

(58) Field of Classification Search
CPC .......... F21K 9/278; F21V 23/06; F21V 23/04; H05B 33/0806; H05B 37/0245; F21Y 2115/10; F21Y 2103/10
(Continued)

(56) References Cited

U.S. PATENT DOCUMENTS

2010/0176742 A1 7/2010 Lee et al.
2010/0270925 A1 10/2010 Withers
(Continued)

FOREIGN PATENT DOCUMENTS

GB 2489505 A 10/2012
WO 2016022612 A1 2/2016

*Primary Examiner* — Daniel D Chang

(57) ABSTRACT

A DC-powered lighting device (100) for placement in an external fixture (102) (104), the DC-powered lighting device comprising a lighting unit (110), connector pins (112) configured to mechanically and electrically connect the DC-powered lighting device to the light fixture, a probing unit (118) connected to the connector pins and configured to determine whether electrical power is currently available via the connector pins and to provide a power-present signal indicative of the current availability of electrical power via the connector pins, a DC-power input unit (114) configured to receive DC power from a second external electrical power source, and to deliver the received DC power to the lighting unit and a switching unit (120) configured to allow the delivery of the DC power to the lighting unit in dependence on the power-present signal.

11 Claims, 4 Drawing Sheets

(51) Int. Cl.
  *F21K 9/278*   (2016.01)
  *H05B 33/08*   (2006.01)
  *F21V 23/04*   (2006.01)
  *F21V 23/06*   (2006.01)
  *F21Y 103/10*  (2016.01)
  *F21Y 115/10*  (2016.01)

(52) U.S. Cl.
  CPC ..... *H05B 33/0806* (2013.01); *H05B 37/0245* (2013.01); *F21Y 2103/10* (2016.08); *F21Y 2115/10* (2016.08)

(58) Field of Classification Search
  USPC ........................................................ 315/160
  See application file for complete search history.

(56) References Cited

U.S. PATENT DOCUMENTS

| | | |
|---|---|---|
| 2014/0049972 A1 | 2/2014 | McGuire et al. |
| 2014/0233226 A1 | 8/2014 | Wallace et al. |
| 2014/0265920 A1 | 9/2014 | Pederson |
| 2014/0306620 A1 | 10/2014 | Maxik et al. |

DC-POWERED LIGHTING DEVICE

CROSS-REFERENCE TO PRIOR APPLICATIONS

This application is the U.S. National Phase application under 35 U.S.C. § 371 of International Application No. PCT/EP2017/057941, filed on Apr. 4, 2017, which claims the benefit of European Patent Application No. 16166628.4, filed on Apr. 22, 2016. These applications are hereby incorporated by reference herein.

FIELD OF THE INVENTION

The invention relates to a DC-powered lighting device, to an electrical arrangement and to a method for operating a DC-powered lighting device

BACKGROUND OF THE INVENTION

US 2010/0270925A1 describes an LED lighting device in a hardware configuration of a traditional fluorescence tube. The tube-shaped LED lighting device has end caps with two pins at each end, the pins being physically identical to the electrodes of the traditional fluorescence tubes. However, the pins of the LED lighting device are not electrically connected. They only serve as a mounting structure for mechanically mounting the LED lighting device in a traditional light fixture that is designed for traditional fluorescence tubes. DC power is received by the LED lighting device of US 2010/0270925A1 via a socket built into one of the end caps. The LED lighting device is powered by an external electrical power source which includes a connection to a line voltage that is routed to a light driver. The light driver is connected by power leads to the socket in the end cap of the LED lighting device

SUMMARY OF THE INVENTION

It is an object of the present invention to improve the usability of pre-installed light fixtures and of electrical circuitry connected thereto after a replacement of a traditional lamp by a DC-powered lighting device.

According to a first aspect of the present invention a DC-powered lighting device for placement in an external light fixture is presented. The DC-powered lighting device comprises:
- a lighting unit configured to emit light in response to receiving DC power;
- a connector configured to mechanically and electrically connect the DC-powered lighting device to the external light fixture;
- a probing unit connected to the connector and configured to determine whether electrical power from a first external electrical power source is currently available at the connector and to provide a power-present signal having a signal value that is indicative of whether or not electrical power in currently available at the connector;
- a DC-power input unit that is different from the connector and configured to receive DC power from a second external electrical power source that is different from the first external electrical power source, and to deliver the received DC power to the lighting unit; and
- a switching unit configured to allow or prevent the delivery of the DC power from the DC-power input unit to the lighting unit in dependence of the current signal value of the power-present signal.

Thus, the DC-powered lighting device of the first aspect of the invention is configured to be mechanically and electrically mounted in an external light fixture and can this way be connected to a first external electrical power source. The connector of the DC-powered lighting device that is to be used for connection to the light fixture is further electrically connected to the probing unit of the DC-powered lighting device. The probing unit is configured to determine whether electrical power is currently available at the connector. Upon determining that electrical power is currently available, the probing unit provides a power-present signal that has a signal value that is indicative of whether or not electrical power in currently available at the connector.

However, the lighting unit of the DC-powered lightning device is not configured to receive power from the first electrical power source. Even though the DC-powered lighting device does not receive the electrical power needed for its lighting operation via the connector pins, it is advantageously configured to probe the presence or availability of electrical power at the connector pins.

Power for operation of the lighting unit is received by the DC-powered lighting device via a DC-power input unit that is different from the connector. This way, DC power can be received from a second external power source that is different from the first power source, and can thus be delivered to the lighting unit for providing the power required for lighting operation.

The DC-powered lighting device further comprises a switching unit configured to allow or prevent the delivery of the DC power from the DC-power input unit to the lighting unit in dependence on the current signal value of the power-present signal.

The DC-powered lighting device of the first aspect of the present invention is thus advantageously configured to replace a traditional lighting device connected to a pre-installed external light fixture designed for such traditional lighting devices and powered by the first external electrical power source via an external electrical circuit. At the same time, control or switching functionality provided in the external electrical circuit for controlling or switching the operation of the installed lighting device can be maintained even though the DC-powered lighting device does not use electrical power of the first electrical power source for lighting operation. The DC-powered lighting device, by virtue of comprising the probing unit, is able to detect any switching operation in the external electrical circuit powered by the first external electrical power source. Such detected information can be used to trigger an operational status change in the DC-powered lighting device even if the electrical DC power needed to operate the device comes from a second electrical power source.

Currently, many existing buildings, in particular office buildings have an AC power distribution infrastructure, which forms an example of the mentioned first external electrical power source. The DC-powered lighting device of the present invention allows re-using this existing AC power distribution infrastructure even when replacing AC-powered traditional lighting with more energy-efficient DC-powered lighting. By employing DC-powered lighting devices according to the present invention, an investment into a new energy-efficient DC power distribution infrastructure (i.e, second external electrical power source) can be reduced by making use of already installed lighting fixtures, and in some application cases even switching and power-control devices such as wall switches etc. that are pre-installed in the context of an existing AC power distribution infrastructure.

In the following, embodiments of the DC-powered lighting device according to the first aspect of the present invention will be described.

In embodiments of the DC-powered lighting device, the lighting unit comprises a housing that accommodates at least one DC-powered light emitter, suitably at least one DC-powered light emitting diode. Different variants of the housing allow partial or full transmission of light generated by the lighting unit in a respective window of the spectrum of light.

Preferably, embodiments of the DC-powered lighting device have an overall geometrical shape that corresponds to the shape of one of the many known traditional lighting devices, such as those known as bulb-type lamps or fluorescence tubes. In particular, the connector preferably is of an Edison screw or bi-pin or bayonet cap connector type. In preferred embodiments, compliance of the geometrical connector shape with existing standardized connector types for lamp fittings is maintained.

In these embodiments, the housing is thus bulb-shaped or tube-shaped. Such embodiments can be used to fit into the corresponding traditional light fixtures and thus for replacing the corresponding traditional bulb-type lamps or fluorescence tubes to provide a more energy-efficient DC-powered lighting infrastructure.

Some embodiments comprise a lighting unit that has one or more light emitting diodes (LEDs) for the light emission. LEDs have a low power consumption and are thus cost-saving for operators in comparison to other lighting devices such as traditional bulb-type lamps or fluorescent tubes. In different embodiments, different combinations of light emitting diodes emitting at different wavelengths are used, enabling DC-powered lighting devices that emit light with a desired spectrum and intensity.

The lighting unit is arranged inside the tube-shaped housing, suitably in a way that the emission of light in a direction away from the light fixture is not hindered by the probing unit, the DC-power input unit, or the switching unit. In some embodiments, the probing unit, the DC-power input unit and the switching unit are arranged on a back side of a carrier, on which the lighting unit is arranged, the back side facing away from a desired direction of light emission.

In some embodiments, the DC-powered lighting device further comprises at least one end cap arranged at one end of the housing and accommodating the probing unit, the DC-power input unit and/or the switching unit. Thus, in some of these embodiments, the probing unit, the DC-power input unit, and the switching unit are accommodated in the end cap. This configuration facilitates flexibility in the production of the lighting device since lighting units having different lighting properties and shapes can be integrated with a common end cap. The end cap is in some embodiments of a shape that fits to different connector configurations. Other embodiments that are suitable in particular for tube-shaped housings comprise two end caps, each arranged at a respective end of the two ends of the tube-shaped housing. The probing unit, the DC-power input unit or the switching unit are then accommodated in either of the two end caps. For example, in one embodiment the DC-power input unit is accommodated in a first end cap, and the probing unit and the switching unit are accommodated in a second end cap. In some embodiments, only the DC-power input unit is accommodated in the cap, whereas the probing unit and the switching units are arranged inside the tube-shaped housing.

In some embodiments the DC-power input unit is located at a side of the end cap being parallel to a longitudinal axis of the tube-shaped housing. This facilitates an easy access to the DC-power input unit for connection of the DC-power input unit to the second external electrical power source at the time of mounting the DC-powered lighting device to the light fixture. In some embodiments having bi-pin connectors, the mounting of the DC-powered lighting device in the light fixture is performed by inserting the connectors into a socket and then turning the DC-powered lighting device into a locked position. In some of these embodiments, the position of the DC-power input unit is advantageously configured so that it faces the light fixture once the DC-powered lighting device is in a locked position. This way, the DC power connection is hidden from view.

In some embodiments the DC-power input unit is further configured to receive operational data indicative of an instruction regarding an operational status of the DC-powered lighting device. The switching unit is further configured to allow the delivery of the DC-power to the lighting unit based on the received operational data. In these embodiments, the power input unit does not only receive the DC-power from the second external electrical power source but also operational data. The operational data provides instructions regarding the operational status of the DC-powered lighting device. The operational data may thus comprise operational instructions intended to change the operational status of the DC-powered lighting device. Those operational instructions comprise, but are not limited to, instructions for switching on or switching off the DC-powered lighting device. In other embodiments the operational instructions further comprise instructions intended to change the intensity of the light emitted by the lighting unit. In other embodiments that have a lighting unit configured for emitting light of different colors covering a field of color values in terms of RGB or CMYK coordinates, the color value to be emitted by lighting unit can be altered by the corresponding operational instruction. The operational data is in some embodiments provided by an external network control device. In some embodiments the probing unit is configured to provide the power-present signal to the external network control device. The operational data provided by the external network control device to the DC-powered lighting device depends on the signal value of the power-present signal.

The switching unit is in one embodiment further configured to allow the delivery of the DC-power to the lighting unit based in the alternative or in addition on the received operational data. In some embodiments, thus, the switching unit is configured to ignore, in one mode of operation, the power-present signal and to allow the delivery of the DC-power only according to the operational data received. Preferably, the switching unit is configured to allow an activation or deactivation of this mode of operation that ignores the power-present signal by suitable operational data. This group of embodiments is for instance useful in case the first external electrical power source undergoes failure, while the second external electrical power source continues to provide DC power.

In other embodiments, the switching unit, in one mode of operation, is configured to allow the delivery of the DC-power to the lighting unit when the power-present signal is received, independently of the operational data received by the DC-power input unit. This embodiment is advantageous for maintaining basic operation also in case normally provided operational data cannot be received, for instance due to a server failure in a control system. In some embodiments, the switching unit is configured to dynamically change a switching rule allowing or blocking the delivery of DC-power to the lighting unit in dependence on predefined set of criteria.

In some embodiments, the DC-power input unit comprises a DC connector for connection to the second external electrical power source. In some of these embodiments the DC connector is an Ethernet connector. In some embodiments the Ethernet connector is configured to only receive DC power. In other embodiments the Ethernet connector is configured to receive both DC power and operational data. Some of these embodiments comply with the Power-over-Ethernet (PoE) standards. PoE is a standardized technology that enables a transmission of DC-power along with operational data on Ethernet cabling, thus allowing a single cable to provide both data connection and DC electrical power to DC-powered lighting devices. In these embodiments, the DC-power input unit is configured to receive the DC power from the external DC power source and the operational data indicative of the instruction regarding an operational status of the DC-powered lighting device. DC power and operational data are sent via a single Ethernet cable that connects the electrical power source (typically called power sourcing equipment (PSE) in PoE terminology) and the DC-powered lighting device (typically called powered device (PD) in PoE terminology). The operational data received is advantageously used to control the operational status of the DC-powered lighting device.

In alternative embodiments, the DC-power input unit also comprises a DC connector for connection to the second external electrical power source, but the DC connector is a universal serial bus connector. In these embodiments, the universal serial bus connector is configured to receive the DC power from the second external electrical power source. In some of these embodiments, the universal serial bus connector is further configured to receive operational data. Different embodiments use different types of USB data protocols, such as, but not limited to USB 1.x, USB 2.0, USB 3.x or USB type C. Different embodiments also use different types of USB connector, such as, but not limited to USB-Standard A, USB-Standard B, mini-USB or micro-USB connectors.

Other embodiments comprise other DC connectors configured to receive DC-power. Some of these DC connectors are additionally configured to receive operational data. A non-exhaustive list of these other DC connectors comprises Thunderbolt connectors and FireWire connectors. Yet another embodiment has two different DC connectors of different connector type that can be used in the alternative in operation of the DC-powered lighting device.

In some embodiments the DC connector is a plug-type connector that is connected to the switching unit by a cable that is configured to extend from the end cap to an exterior of the DC-powered lighting device, in case of connection to the second external electrical power source. In some of these embodiments, the end cap comprises a retraction mechanism, for instance powered by a mechanical spring that is configured to retract the cable into the end cap in case it is not connected to the second external electrical power source. In these embodiments the cable is configured to be pulled out of the end cap and towards the exterior of the DC-powered lighting device up to a given extension and to retract to a position inside the end cap.

According to a second aspect of the present invention, an electrical arrangement is presented. The electrical arrangement comprises a light fixture for connection of a DC-powered lighting device to a first external electrical power source, and the DC-powered lighting device according to the first aspect of the present invention. The DC-powered lighting device is placed in the light fixture and it is configured to be connected to a second external power source that provides DC-power and is different from the first electrical power source.

In some particularly advantageous embodiments, the light fixture is compatible with other lighting devices such as, but not limited to, incandescent or halogen lamps or fluorescence tubes that are configured to be placed in the light fixture and to receive electrical power from the first external electrical source. The use of the DC-powered lighting device of the first aspect of the present invention in the electrical arrangement of this aspect improves the usability of the light fixture and of electrical circuitry connected thereto after a replacement of a traditional lighting device (e.g., incandescent lamps, halogen lamps, fluorescence tubes, etc.) with the DC-powered lighting device by allowing to control the operational status of the device using the presence of electrical power from the first external electrical power source at the connector pins. In this way, any switching devices present in the electrical circuitry connected to the first electrical power source, such as, but not limited to switches or fuses, can still be used to control the operational status of the DC-powered device.

Some embodiments of the electrical arrangement further comprise a network control device that is connected to the DC-power input unit. The network control device is configured to receive the power-present signal from the DC-powered lighting device and to output to the DC-powered lighting device operational data indicative of an instruction regarding an operational status of the DC-powered lighting device. In some of these embodiments the network control unit is configured to output operational data indicative of an instruction regarding a change of the operational status of the DC-powered lighting device (e.g. switch the lighting unit off even if the DC-powered lighting device was on, or vice versa) upon detecting a predetermined change in the power-present signal. In exemplary application cases, while these embodiments allow a control of an operational status of the DC-powered lighting device by, for example, an external switch connected to the first external electrical power source, this control can be performed independently of the actual switching state of this external switch.

For example, a DC-powered lighting device being in an on-state (i.e. the lighting unit is emitting light) and providing a power-present signal that is indicative of a lack of available electrical power at the connector (due for example to the fact that a switching device located between the first external electrical power source and the light fixture is in an off-state) can be switched off via the network control device, even though electrical power from the first external electrical power source is detected to have become available at the connector. This is possible because operating the external switch triggers a change in the current signal value of the power-present signal. This change is interpreted by the network control device as an indication that, for example, an external user wants to change the operational status of the DC-powered lighting device.

In some embodiments, the network control device is a Power Sourcing Equipment (PSE) in accordance with Power over Ethernet technology.

According to a third aspect of the present invention, a method for operating a DC-powered lighting device is presented. The method comprises:

mechanically and electrically connecting the DC-powered lighting device to a light fixture via a connector;

determining whether electrical power from first external electrical power source is currently received via the connector;

providing a power-present signal having a signal value that is indicative of whether or not electrical power is currently available via the connector;

receiving, via a DC-power input unit that is different from the connector pins, DC power from a second external electrical power source that is different from the first electrical power source; and allowing or preventing a delivery of the DC power from the DC-power input unit to a lighting unit of the DC-powered lighting device in dependence on the current signal value of the power-present signal.

The method of the third aspect of the present invention shares the advantages of the DC-powered lighting device of the first aspect of the invention.

In the following, embodiments of the third aspect of the invention will be described.

In some embodiments, the method of the third aspect comprises receiving operational data indicative of an instruction regarding an operational status of the DC-powered lighting device and allowing a delivery of the DC power to the lighting unit further based on the received operational data. These embodiments are particularly advantageous for operating DC-powered lighting devices under PoE standards or using a USB connection for receiving DC power and operational data. These embodiments of the method of the third aspect share the advantages of the DC-powered lighting device of the first aspect of the invention.

It shall be understood that the DC-powered lighting device of claim 1, the electrical arrangement of claim 10 and the method for operating a DC-powered lighting device of claim 12 have similar and/or identical preferred embodiments, in particular, as defined in the dependent claims.

It shall also be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
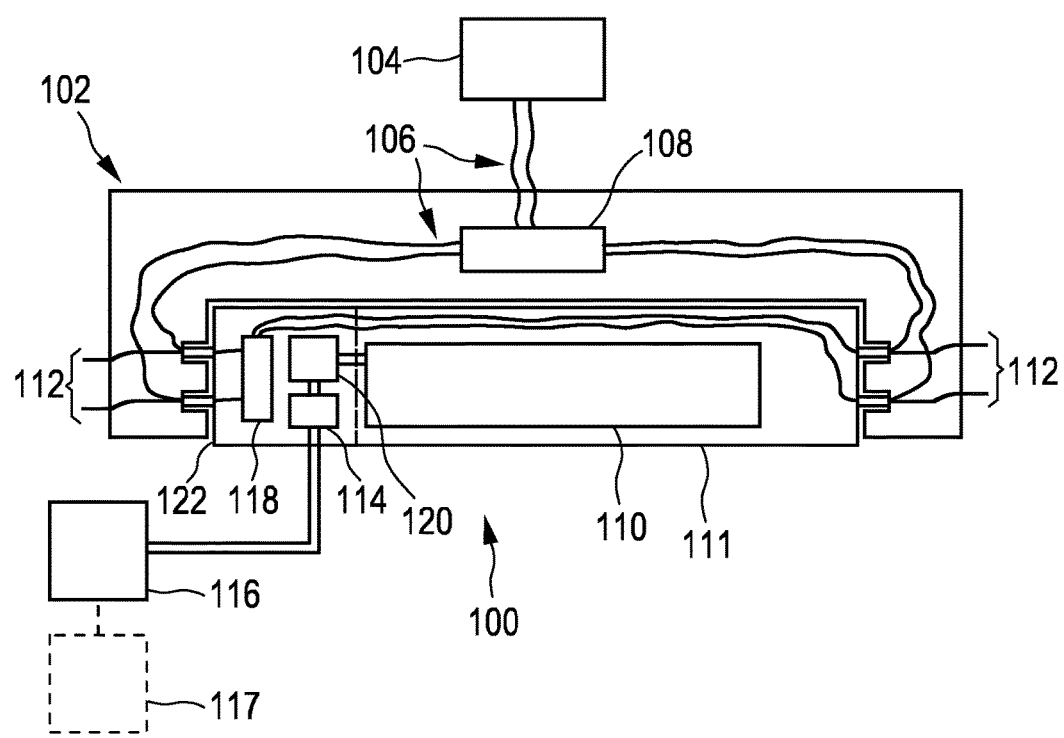
FIG. 1 shows an exemplary illustration of an embodiment of a DC-powered lighting device fixed to an external light fixture

FIG. 1 shows an exemplary illustration of an embodiment of a DC-powered lighting device 100 fixed to an external light fixture 102 for connection of the lighting device to a first external electrical power source 104. The DC-powered lighting device and 100 and the light fixture 102 form an electrical arrangement in the sense of this invention. The light fixture in this non-limiting example has been previously used to hold a fluorescence tube using a connector in the form of a standardized bi-pin connector on each longitudinal end. However, by consideration of known differences between the standard electrical and mechanical connector specifications, the example can easily be modified for another type of DC-powered lighting device and light fixture, such as a bulb-type DC-powered lighting device having a standard Edison screw connector or a bayonet cap. The following thus describes an example of a DC-powered lighting device with one or more bi-pin connectors, without loss of generality in terms of the used connector type.

The light fixture 102 is configured to provide mechanical fixing and electrical power from the first power source to the fluorescence tube. The light fixture 102 is connected to the external electrical power source 104 by electrical wiring 106 and through an electrical ballast 108, configured to limit the amount of current in the fluorescence tube. The DC-powered lighting device 100 is advantageously configured to be fixed to the same light fixture 102. The DC-powered lighting device comprises a lighting unit 110 configured to emit light in response to receiving DC power. The lighting unit 110 comprises an LED board with a plurality of LED light sources (not shown) and is accommodated in a tube-shaped housing 111. The DC-powered lighting device comprises a connector in the form of connector pins 112 configured to mechanically and electrically connect the DC-powered lighting device to the external light fixture 102. The connector pins are, in this embodiment, bi-pin connectors as used for example in many fluorescence tubes and other lighting devices.

The power needed to operate the lighting unit 110 of the DC-powered lighting device is not received via the connector pins. Instead, the DC-powered lighting device has a DC-power input unit 114 configured to receive DC power from a second external electrical power source 116, that is different from the first external electrical power source 104. This second electrical power source is configured to generate the electrical DC power required to operate the DC-powered lighting device 100.

A probing unit 118 is connected to the connector pins and is configured to determine whether electrical power from a first external electrical power source is currently available via the connector pins and to provide a power-present signal having a signal value that is indicative of whether or not electrical power is currently available via the connector pins.

This power-present signal is received by a switching unit 120 that is further configured to allow or prevent the delivery of the DC power from the DC-power input unit to the lighting unit in dependence on the current signal value of the power-present signal. In this example, the DC-power input unit 114, the probing unit 118 and the switching unit 120 are accommodated in an end cap 122 that is arranged at one end of the tube-shaped housing 111 at a position indicated with a dashed line in FIG. 1.

The probing unit 118 and the switching unit can be integrated in the form of a relay so that when electric current is passed through a coil connected to the connector pins (i.e. the probing unit), a magnetic field is generated (i.e. power-present signal) that activates a movement of a movable contact (i.e. switching unit) that either makes or breaks an electrical connection between the DC-power input unit and the lighting unit thus allowing or preventing the delivery of the DC power to the lighting unit. In other exemplary configurations such as the one shown in FIG. 1 the probing unit and the switching unit are separate units implemented by dedicated electrical circuitry, or a microcontroller or microprocessor, the latter two allowing more operational flexibility. For example, in some of these embodiments, the probing unit is further configured to measure an amount of external electrical power present at the connector pins 112 and to provide the power-present signal only if the detected amount of external electrical power is above a predetermined minimum operating power threshold amount.

The DC-powered lighting device 100 can be advantageously used as a replacement for fluorescence tubes of a similar length, that share the same configuration of connector pins. Furthermore, the DC-powered lighting device is configured to be controlled by the existing electrical wiring 106 that connect the light fixture 102 to the first electrical power source 104. If this electrical circuit comprises switching devices configured to control the delivery of power to the fluorescence tube, these switching devices can still be advantageously used to control the operational status of the DC-powered lighting device even though the lighting units gets its power from a second external electrical power source 116. In this embodiment 100, the second external electrical power source is a power sourcing equipment (as known in the field of Power over Ethernet technology) that is configured to send DC-power and operational data indicative of the instruction regarding an operational status of the DC-powered lighting device. This operational data is also used by the switching unit to allow the delivery of the DC power to the lighting unit based on the received operational data. In some embodiments, the switching unit may be configured to ignore the power-present signal and to deliver the DC power just as a function of the received operational data. In these cases, operating a switch intended to provide power from the first external electrical power source to the light fixture will not result in any changes in the operational status of the DC-powered lighting device, meaning that the DC-powered lighting device can also be controlled remotely independently of the actual position of the switch or the configuration of the first external electrical circuit.

In some embodiments, the electrical arrangement further comprises a network control device 117. The network control device is connected to the DC power input unit 114 and configured to receive the power present signal and to output operational data indicative of an instruction regarding an operational status of the DC-powered lighting device. The output operational data depends on the power-signal. In some embodiments, the signal value of the power-present signal is sent to the network control device, which outputs, according to predetermined decisions rules based on the signal value of the power-present signal, the operational data to the DC-powered lighting device. In some embodiments, the output operational data depends on the current signal value of the power-present signal. In other embodiments, the output operational data depends on a change in the current signal value of the power present signal. In these cases, for example, a change in the power-present signal is caused by a user activating an external switch connected to the first external electrical power source. The user is not necessarily aware of the actual switching status of the external switch (i.e. if the switch is in an on-state and thus power is available at the connector or vice versa). Operating the switch thus results in a change of the operational status of the DC-powered lighting device, which may, or may not correspond to the switching status of the external switch.

Figure 2:
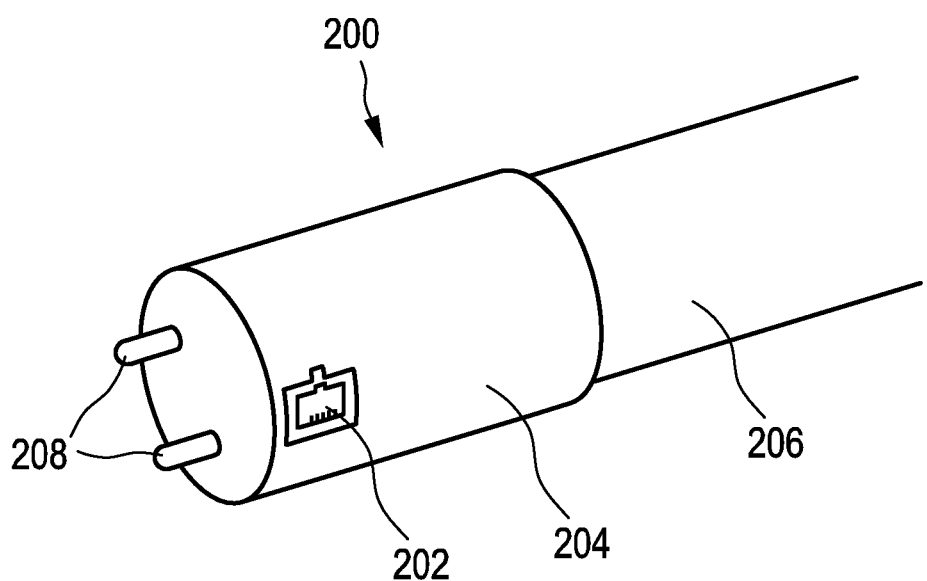
FIG. 2 shows an exemplary representation of another embodiment of a DC-powered lighting device

FIG. 2 shows a schematic representation of another embodiment of a DC-powered lighting device 200. In this embodiment, the probing unit, the switching unit and the DC-power input unit, which comprises in this case a DC connector in the form of a socket-type Ethernet connector 202, are accommodated in an end cap 204. The end cap is arranged at one end of a tube-shaped housing 206 and accommodates the lighting unit. Internally, the probing unit (not shown) is connected to the connector bi-pins 208. This embodiment is particularly advantageous since it simplifies the production of the DC-powered lighting device.

Figure 3:
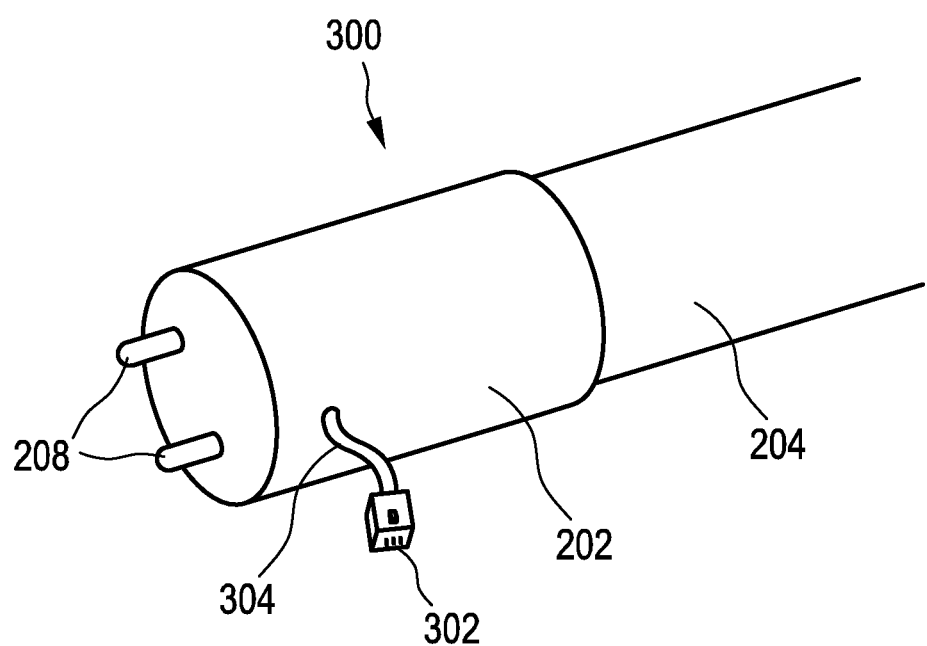
FIG. 3 shows an exemplary representation of another embodiment of a DC-powered lighting device

Lighting units to be accommodated in tube-shaped housings 206 can be produced and then arranged with one of a plurality of different caps having different connector pins or different functionalities according to the different embodiments of the invention. In this embodiment, the DC-power input unit (i.e. the socket-type Ethernet connector 202) is placed on the side (e.g. radially) of the cylinder-like cap 204. This allows inserting the connector pins 208 before turning the DC-powered lighting device into a locked position. In this locked position, the Ethernet connector and the cable are hidden by the light fixture (not shown). In some embodiments, the DC-power input unit comprises a socket-type universal serial bus, or other socket-type connector of a connection technology configured to transmit DC-power and operational data such as, but not limited to, a Thunderbolt connector or a FireWire connector FIG. 3 shows a schematic representation of another embodiment of a DC-powered lighting device 300. In this particular embodiment, the DC-power input unit comprises a male DC connector 302, suitable for Ethernet, attached to a cable 304. In some embodiments the cable can be pulled out up to a certain length extension outside the cap 202. In other embodiments DC-powered lighting device further comprises a retraction mechanism that is configured to retract the cable into the end cap. In this way, these embodiments allow an extension of the cable 304 up to the required length to connect the male DC connector 302. The rest of the cable is conveniently accommodated inside the cap.

Other embodiments comprise a universal serial bus male connector attached to a corresponding cable. In some of these embodiments the cable is configured to be pulled out up to a certain length extension outside the cap and some of these embodiments further comprise a retraction mechanism as stated above.

Figure 4:
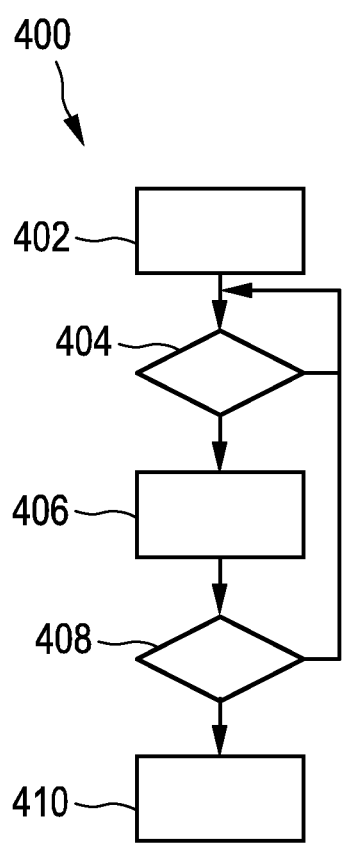
FIG. 4 shows a flow diagram of an embodiment of a method for operating a DC-powered lighting device.

FIG. 4 shows a flow diagram of an exemplary embodiment of a method 400 for operating a DC-powered lighting device. The method comprises, in a step 402 connecting both mechanically and electrically the DC-powered lighting device to a light fixture via connector pins. It further comprises determining, in a step 404 whether electrical power from first external electrical power source is currently available at the connector. This testing is performed repeatedly during operation of the DC-powered lighting device. Depending on the current findings of the determining step 404, the method then provides, in a step 406 a power-present signal that has a value that is indicative of whether or not electrical power is available via the connector, i.e., from first external electrical power source. In step 408, the method determines if DC-power from the second external electrical power source is received at the DC power input unit. If no DC-power is received the method branches back to step 404. If DC-power is received, this exemplary embodiment of the method further comprises, in a step 410, allowing or preventing a delivery, to a lighting unit, of the DC power. The delivery of the DC power depends on the current signal value of the power-present signal.

In a variant of this embodiment, step 408 is performed in parallel to steps 404 and 406.

In other variants, the delivery of DC power to the lighting unit also depends on received operational data indicative of an instruction regarding an operational status of the DC-powered lighting device. That means that control-information derived from the power-present signal may be "overruled" by other control information in the form of operational data.

This may for instance be useful in a lighting network. In some embodiments, the power-present signal is sent to a network control device, for instance to a Power Sourcing Equipment (PSE) via a data connection provided according to Power over Ethernet technology. The network control device further provides to the DC-power input unit operational data indicative of an instruction regarding an operational status of the DC-powered lighting device. The switching unit in these embodiments is further configured to allow the delivery of the DC-power to the lighting unit based on the received operational data.

A particularly simple embodiment of a DC-powered lighting device for placement in an external fixture comprises a lighting unit, connector pins configured to mechanically and electrically connect the DC-powered lighting device to the light fixture, a probing unit connected to the connector pins and configured to determine whether electrical power is currently available via the connector pins and to pro-vide a power-present signal indicative of the current availability of electrical power via the connector pins, a DC-power input unit configured to receive DC power from a second external electrical power source, and to deliver the received DC power to the lighting unit and a switching unit configured to allow the delivery of the DC power to the lighting unit in dependence on the power-present signal.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A DC-powered lighting device for placement in an external light fixture, the DC-powered lighting device comprising:
    a lighting unit configured to emit light in response to receiving DC power;
    a connector configured to mechanically and electrically connect the DC-powered lighting device to the external light fixture;
    a probing unit connected to the connector and configured to determine whether electrical power from a first external electrical power source is currently available via the connector and to provide a power-present signal having a signal value that is indicative of whether or not electrical power is currently available via the connector;
    a DC-power input unit that is different from the connector and is configured to receive DC power from a second external electrical power source that is different from the first external electrical power source, and to deliver the received DC power to the lighting unit; and
    a switching unit configured to allow or prevent the delivery of the DC power from the DC-power input unit to the lighting unit in dependence on the current signal value of the power-present signal,
wherein the DC-power input unit comprises a DC connector for connection to the second external electrical power source, and wherein the DC connector is an Ethernet connector or a universal serial bus connector.

2. The DC-powered lighting device of claim 1, wherein the lighting unit comprises a housing that accommodates at least one DC-powered light emitting diode.

3. The DC powered lighting device of claim 1, wherein the connector is a bi-pin connector or an Edison screw connector or a bayonet cap connector.

4. The DC-powered lighting device of claim 2, further comprising an end cap arranged at one end of the housing and accommodating the probing unit, the DC-power input unit or the switching unit.

5. The DC-powered lighting device of claim 1, wherein the DC-power input unit is further configured to receive operational data indicative of an instruction regarding an operational status of the DC-powered lighting device, and wherein the switching unit is further configured to allow the delivery of the DC-power to the lighting unit based on the received operational data.

6. The DC-powered lighting devices of claim 1, wherein the DC connector is a plug-type connector that is connected to the switching unit by a cable that is configured to extend from the end cap to an exterior of the DC-powered lighting device in case of connection to the second external electrical power source.

7. The DC-powered lighting device of claim 6 wherein the end cap comprises a retraction mechanism that is configured to retract a cable into the end cap in case it is not connected to the second external electrical power source.

8. An electrical arrangement comprising a light fixture for connection of a lighting device to a first external electrical power source, and the DC-powered lighting device according to claim 1, which is placed in the light fixture, the DC-powered lighting device configured to be connected to a second external electrical power source that provides DC power and is different from the first electrical power source.

9. The electrical arrangement of claim 8, further comprising a network control device connected to the DC power input unit, the network control unit configured:
    to receive the power-present signal from the DC-powered lighting device
    to output operational data indicative of an instruction regarding an operational status of the DC-powered lighting device to the DC-powered lighting device.

10. A method for operating a DC-powered lighting device, the method comprising:
    mechanically and electrically connecting the DC-powered lighting device to a light fixture via a connector;
    determining whether electrical power from a first external electrical power source is currently available via the connector;
    providing a power-present signal having a signal value that is indicative of whether or not electrical power is currently available via the connector;
    receiving, via a DC-power input unit that is different from the connector pins, DC power from a second external electrical power source that is different from the first electrical power source; and allowing or preventing a delivery of the DC power from the DC-power input unit to a lighting unit of the DC-powered lighting device in dependence on the current signal value of the power-present signal, wherein the DC-power input unit comprises a DC connector for connection to the second external electrical power source, and wherein the DC connector is an Ethernet connector or a universal serial bus connector.

11. The method of claim 10, further comprising:

receiving operational data indicative of an instruction regarding an operational status of the DC-powered lighting device; and allowing or preventing a delivery of the DC power to the lighting unit further based on the received operational data.

* * * * *